United States Patent
Messner et al.

(10) Patent No.: US 11,543,816 B2
(45) Date of Patent: Jan. 3, 2023

(54) SIGNALING INFORMATION ON A DETECTED PARKING SPACE TO THE OPERATOR OF A REMOTE CONTROL FOR A PARKING ASSISTANCE SYSTEM WHICH CAN BE CONTROLLED BY REMOTE CONTROL FOR AUTOMATICALLY PARKING A MOTOR VEHICLE

(71) Applicant: Bayerische Motoren Werke Aktiengesellschaft, Munich (DE)

(72) Inventors: Alex Messner, Rasun (IT); Rebecca Pascal, Munich (DE); Georgios Lidoris, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 891 days.

(21) Appl. No.: 15/784,801

(22) Filed: Oct. 16, 2017

(65) Prior Publication Data
US 2018/0039264 A1 Feb. 8, 2018

Related U.S. Application Data

(63) Continuation of application No. PCT/EP2016/057980, filed on Apr. 12, 2016.

(30) Foreign Application Priority Data

Apr. 17, 2015 (DE) ...................... 10 2015 206 998.2
Apr. 30, 2015 (DE) ...................... 10 2015 208 124.9

(51) Int. Cl.
*G05D 1/00* (2006.01)
*B62D 15/02* (2006.01)
(Continued)

(52) U.S. Cl.
CPC .......... *G05D 1/0022* (2013.01); *B60W 30/06* (2013.01); *B62D 15/0285* (2013.01);
(Continued)

(58) Field of Classification Search
None
See application file for complete search history.

(56) References Cited

U.S. PATENT DOCUMENTS 9,361,529 B2 * 6/2016 Ryu ..................... G06V 20/586
2006/0113119 A1 6/2006 Dudeck et al.
(Continued)

FOREIGN PATENT DOCUMENTS

CN 101804812 A 8/2010
CN 103209875 A 7/2013
(Continued)

OTHER PUBLICATIONS

Chinese Office Action issued in Chinese counterpart application No. 201680007198.3 dated Dec. 20, 2018 (Eleven (11) pages).
(Continued)

*Primary Examiner* — Alan D Hutchinson
(74) *Attorney, Agent, or Firm* — Crowell & Moring LLP

(57) ABSTRACT

One aspect of the invention relates to a method for signaling information to the operator of the remote control for a parking assistance system which can be controlled by remote control from outside of a motor vehicle for automatically parking the motor vehicle into a parking space.
(Continued)

The method includes detecting surroundings information with respect to the vehicle surroundings on the motor vehicle side using a surrounding sensor system of the motor vehicle. The parking assistance system in the motor vehicle detects a parking space on the basis of the surroundings information, and information on the detection of a parking space is transmitted from the motor vehicle to the remote control via a wireless communication connection. On the basis of the received information, the remote control signals the presence of the detected parking space to the operator.

16 Claims, 5 Drawing Sheets

(51) Int. Cl.
*G08G 1/16* (2006.01)
*G08G 1/14* (2006.01)
*B60W 30/06* (2006.01)
*G06V 20/58* (2022.01)
*G05D 1/02* (2020.01)
*G06F 3/04817* (2022.01)
*G06F 3/0488* (2022.01)

(52) U.S. Cl.
CPC ......... *G05D 1/0038* (2013.01); *G05D 1/0238* (2013.01); *G05D 1/0255* (2013.01); *G06V 20/586* (2022.01); *G08G 1/14* (2013.01); *G08G 1/142* (2013.01); *G08G 1/144* (2013.01); *G08G 1/168* (2013.01); *G05D 2201/0213* (2013.01); *G06F 3/0488* (2013.01); *G06F 3/04817* (2013.01)

(56) References Cited

U.S. PATENT DOCUMENTS

| | | | |
|---|---|---|---|
| 2008/0033603 A1* | 2/2008 | Gensler | B62D 15/0285 701/1 |
| 2008/0231469 A1* | 9/2008 | Knoll | B62D 15/027 340/932.2 |
| 2010/0259420 A1* | 10/2010 | Von Reyher | B62D 15/028 340/932.2 |
| 2017/0323567 A1* | 11/2017 | Nordbruch | B60W 30/00 |

FOREIGN PATENT DOCUMENTS

| | | | | |
|---|---|---|---|---|
| CN | 103857583 A | | 6/2014 | |
| DE | 102 61 176 A1 | | 7/2004 | |
| DE | 10 2006 005 059 A1 | | 8/2007 | |
| DE | 101 20 511 B4 | | 11/2010 | |
| DE | 10 2012 007 984 A1 | | 3/2013 | |
| DE | 102012007984 A1 | * | 3/2013 | ............... B62D 1/00 |
| DE | 10 2011 084 124 A1 | | 4/2013 | |
| DE | 10 2012 203 235 A1 | | 9/2013 | |
| EP | 2 292 497 A2 | | 3/2011 | |
| EP | 2292497 A2 | * | 3/2011 | ........... B62D 15/028 |
| JP | 2006-302187 A | | 11/2006 | |
| KR | 101470240 B1 | * | 11/2013 | |
| WO | WO 2013/050194 A1 | | 4/2013 | |
| WO | WO 2013/053776 A2 | | 4/2013 | |

OTHER PUBLICATIONS

PCT/EP2016/057980, International Search Report dated Jun. 24, 2016 (Three (3) pages).

German Office Action issued in German counterpart application No. 10 2015 208 124.9 dated Mar. 15, 2016 (Two (2) pages).

* cited by examiner

SIGNALING INFORMATION ON A DETECTED PARKING SPACE TO THE OPERATOR OF A REMOTE CONTROL FOR A PARKING ASSISTANCE SYSTEM WHICH CAN BE CONTROLLED BY REMOTE CONTROL FOR AUTOMATICALLY PARKING A MOTOR VEHICLE

CROSS REFERENCE TO RELATED APPLICATIONS

This application is a continuation of PCT International Application No. PCT/EP2016/057980, filed Apr. 12, 2016, which claims priority under 35 U.S.C. § 119 from German Patent Applications Nos. 10 2015 206 998.2, filed Apr. 17, 2015, and 10 2015 208 124.9, filed Apr. 30, 2015, the entire disclosures of which are herein expressly incorporated by references.

BACKGROUND AND SUMMARY OF THE INVENTION

The invention relates to the signaling of information to the operator of the remote control for a parking assistance system, controllable by remote control from outside a motor vehicle, for automatically parking the motor vehicle in a parking space.

Various types of parking assistance systems are known. Simple parking assistants comprise an ambient sensor system, for example a radar sensor system or an ultrasonic sensor system, for identifying obstacles, the distance to the identified obstacle being communicated to the driver in a visual and/or audible fashion. Above that, parking assistance systems having automated transverse guidance are known that take the driving task of steering away from the driver during parking and steer the vehicle along a computed parking trajectory into a parallel parking space or a perpendicular parking space, with the driver continuing to operate the brake and gas pedals. Furthermore, parking assistance systems having automated transverse and longitudinal guidance are known that additionally control the drive and the brake as well. The parking assistance system in this case performs the driving task for as long as the driver operates a pushbutton switch in the vehicle. Using the pushbutton switch in the vehicle, the driver exercises control over the parking process. In the case of these parking assistants, the driver remains in the driver's seat. However, parking assistance systems are known, for example for forward parking spaces (e.g. a single garage) that can be parked in a forward direction or reverse direction, in which the driver is situated outside the vehicle during the parking process. In this case, control of the parking process is relocated to a remote control. Such parking assistance systems for forward parking spaces are also referred to as a garage parking assistant.

The document WO 2013/053776 A2 describes a parking assistance system controllable by remote control for automated parking in a forward parking space (particularly a single garage), wherein the remote control comprises a control element for controlling the forward travel and a control element for controlling the reverse travel. When the vehicle has been stopped in front of a forward parking space, the operator can steer the vehicle into the parking space using automated longitudinal guidance from outside the vehicle by operating the control element for controlling the forward travel. In this case, the remote control is used not only for sending control information to the parking assistance system in the vehicle, but also for receiving information provided by the parking assistance system in the vehicle about the presence of an obstacle, the presence of an obstacle in the forward direction or reverse direction being signaled using signaling means, e.g. using a screen on the remote control.

It is an object of the invention to provide the operator of a parking assistance system controllable by remote control for automated parking with further information by means of the remote control.

The object is achieved by the features of an independent patent claims. Advantageous embodiments are described in the dependent claims. It is pointed out that additional features of a patent claim dependent on the independent patent claim can, without the features of the independent patent claim or just in combination with a subset of the features of the independent patent claim, form a separate invention that is independent of the combination of all of the features of the independent patent claim and that can be turned into the subject matter of an independent claim, of a divisional application or of a subsequent application. This applies in the same way to concepts disclosed in the description that are able to form an invention independent of the features of the independent patent claims, particularly for the exemplary concepts, described as part of the application, of identification of the parking space based on anchor points and lateral parking space orientation lines, determination of a parking line and adjustment of the vehicle longitudinal axis to the parking line.

A first aspect of the invention relates to a method for signaling information to the operator of the remote control for a parking assistance system, controllable by remote control from outside a motor vehicle, for automatically parking the motor vehicle in a parking space.

Preferably, a parking assistance system for (head-on and/or reverse) parking in a forward parking space, particularly for parking in a forward parking space that can be parked in head-on (for example a single garage or double garage) is involved. The parking assistance system comprises automated longitudinal guidance and preferably also automated transverse guidance. By way of example, the parking assistance system supports automated steering into a forward parking space identified by the system when the motor vehicle is parked slightly at an angle in front of the forward parking space.

In accordance with the method, the motor vehicle determines surroundings information regarding the vehicle surroundings by means of an ambient sensor system that the vehicle comprises, for example by means of an ultrasonic sensor system in the vehicle front and/or by means of a forward-directed camera in the vehicle. By way of example, the ambient sensor system is used to determine the position of objects, for example the position of lateral boundaries of a parking space such as vehicles, lateral walls of the parking space or markings put on the ground, and these objects are entered in a surroundings map of the vehicle surroundings.

The parking assistance system in the motor vehicle identifies a parking space based on the surroundings information. By way of example, the identification of a parking space involves a left and a right anchor point (typically the two corners), which denote the entrance of the parking space, and a left and a right lateral parking space orientation line being sought, which are defined by the two lateral boundary objects of the parking space. The parking space orientation line preferably has no defined length and is preferably of arbitrary length. By way of example, a parking space is rated as identified when at least one anchor point and a lateral parking space orientation line on the same side or a second anchor point is found.

A parking space is identified when the motor is started before driving away, for example. However, the surroundings information and the structure of the surroundings map are actually preferably determined before the vehicle is parked. Preferably, when a parking space has not been identified, continual attempts are made during an automated parking maneuver to identify a parking space.

Information about the identification of a parking space is sent from the motor vehicle to the remote control via a wireless communication link, said information then being received by the remote control.

Based on the received information, the remote control signals to the operator the presence of an identified parking space. Provided that, for example initially, particularly prior to driving away, no parking space has been identified, the parking assistance system preferably allows a parking space still to be identified later too, in the course of the parking maneuver; the later identification of the parking space is then preferably communicated to the driver via the remote control.

The method according to the invention affords the advantage that the driver is informed about the status of the parking space identification via the remote control. Provided that the parking assistance system also supports automated transverse guidance for an identified forward parking space, for example, and, when a forward parking space is not identified, merely steers the vehicle straight on without turning the steering wheel or does not steer the vehicle in automated fashion at all, the driver knows that in the absence of an identified forward parking space being signaled or in the case of explicit signaling of a parking situation where a parking space has not been identified, the vehicle will not be steered into the forward parking space using automated transverse guidance.

Preferably, the identification of the parking space involves, or the identification is followed by, the motor vehicle using a criterion or multiple criteria in respect of the ability of a parking space to be parked in to establish that the parking space can be parked in from the current vehicle position by remote control using the parking assistance system. When a forward space can be parked in, a criterion in respect of the ability of the parking space to be parked in can relate to the orientation of the vehicle with respect to the parking space, e.g. the angle formed by the vehicle and the forward parking space. To establish the ability of a parking space to be parked in, for example, it is possible to check that the absolute value of the angle between the orientation of the vehicle and an orientation of the parking space is less than or less than or equal to a defined threshold value (e.g. 15° or 30°). An alternative or additional (cumulative) criterion can relate to the lateral offset of the vehicle with respect to the parking space, i.e. the extent to which the vehicle and the forward parking space are offset from one another at the side. By way of example, within the context of the ability of a parking space to be parked in, it is possible to check that the lateral offset of a reference point on the parking space and a reference point on the vehicle is less than or less than or equal to a threshold value (e.g. 1.0 m or 1.5 m). An alternative or additionally checked criterion can relate to the width of the parking space, i.e. whether the width of the parking space is adequate. Within the context of the ability of a parking space to be parked in, for example, it is possible to check whether the width of the parking space is greater than or greater than or equal to a defined threshold value (e.g. the vehicle width plus 70 cm). An alternative or additionally checked criterion can relate to the distance of the vehicle from the parking space. The background to this is, by way of example, that the maximum displacement path can be limited (e.g. to 1.5 times the vehicle length) and the vehicle then possibly cannot enter the parking space completely if the distance is too great. In this regard, it is possible, by way of example, to determine the distance between a vehicle reference point (e.g. the middle of the rear axle) and a reference point on the parking space (e.g. the central point between the two anchor points) and to check whether this distance is less than or less than or equal to a defined threshold value (e.g. 9 m).

On establishment of a parking space that can be parked in and that can be parked in from the current vehicle position by remote control, the vehicle then sends information about the identification of a parking space that can be parked in to the remote control. This information is received by the remote control, and the remote control signals the presence of an identified parking space that can be parked in from the current vehicle position by remote control to the operator of the remote control.

Preferably, the parking assistance system in the motor vehicle can distinguish between at least two different parking situation types having a parking space that can be parked in with a different Q factor for the ability of the parking space to be parked in, e.g. forward parking spaces that can be parked in without a problem in one move in a forward direction or reverse direction from the current vehicle position by remote control and forward parking spaces that, although they can fundamentally be parked in using the remote control, possibly require several moves, and the driver then needs to reverse the vehicle, in the course of a parking process in a forward direction, the vehicle a certain distance in a reverse direction by remote control so as then to be able to complete the parking process in the forward direction.

By way of example, a parking situation type with a higher Q factor for the ability of a parking space to be parked in exists when one or more parameters checked for the ability of the parking space to be parked in are within narrower limits (e.g. less than or equal to or less than 15° for the absolute value of the orientation difference between the parking space and the vehicle and less than or equal to or less than 1 m for the absolute value of the lateral offset), and a parking situation type with a comparatively lower Q factor for the ability of a parking space to be parked in exists when said parameter or said parameters are within (in comparison with the narrower limits) less narrow limits (e.g. less than or equal to or less than 30° for the absolute value of the orientation difference between the parking space and the vehicle and less than or equal to or less than 1.5 m for the absolute value of the lateral offset). By way of example, an identified parking space is categorized as not able to be parked in when a parameter checked for the ability of the parking space to be parked in is outside the less narrow limits, for example for an orientation difference greater than 30° or a lateral offset greater than 1.5 m.

When a parking situation having a parking space that can be parked in with a higher Q factor for the ability of the parking space to be parked in is established, a piece information about the presence of such a parking situation is sent to the remote control; after reception of this information by the remote control, the presence of a parking space that can be parked in with a higher Q factor for the ability of the parking space to be parked in is signaled to the operator of the remote control.

When a parking situation having a parking space that can be parked in with a comparatively lower Q factor for the ability of the parking space to be parked in is established, a piece of information about the presence of such a parking situation is sent to the remote control; after reception of this information by the remote control, the presence of a parking space that can be parked in with a lower Q factor for the ability of the parking space to be parked in is signaled to the operator of the remote control.

This idea is not just limited to two different parking situation types with a different Q factor for the ability of an identified parking space to be parked in: it would also be conceivable to distinguish between more than two parking situation types with a different Q factor for the ability of an identified parking space to be parked in, for example 3, 4 or 5 such types. It is also possible to select a very low resolution for the distinction.

By way of example, the parking assistance system in the motor vehicle can distinguish between two, three or all of the following parking situation types:

1. no identified parking space,
2. an identified parking space that can be parked in, which can be parked in from the current vehicle position by remote control using the parking assistance system,
3. an identified parking space that can be parked in, which can be parked in from the current vehicle position by remote control using the parking assistance system, wherein the Q factor of the ability of the parking space to be parked in is lower than in the case of the aforementioned parking situation type having a parking space that can be parked in, and
4. an identified parking space that cannot be parked in from the current vehicle position by remote control using the parking assistance system.

Preferably, all of the parking situation types under 1.-4. are distinguishable by the parking assistance system.

Information about the identified parking situation is sent from the parking assistance system in the vehicle to the remote control.

By way example, the remote control is sent a byte, the value of which indicates which parking situation type currently exists.

Preferably, two parking situation types from the parking situation types under 1.-4., all of the parking situation types from the parking situation types under 1.-4. or just a subset of the parking situation types under 1.-4. can be signaled to the user via the remote control in a manner distinguishable for the user by different signals associated with the individual parking situation types. By way of example, four different signals (for example 4 different pictograms on a screen on the remote control) are used for signaling the 4 parking situation types. Alternatively, however, it would be possible for situations 1. and 4. to be signaled to the user by remote control using the same signal (for example by using the same pictogram for these parking situations).

As already explained above, the parking assistance system is preferably a parking assistance system that is suitable for parking in forward parking spaces situated in front of the motor vehicle by traveling forwards (with the vehicle being parked with its front in front of the parking space). The parking assistance system may, however, additionally or alternatively also be suitable for reverse parking in forward parking spaces (where the vehicle is parked with its rear in front of the parking space). To this end, the remote control preferably comprises a control means for controlling the forward travel and/or a control means for controlling the reverse travel of the motor vehicle. By way of example, a parking assistance system is involved that is suitable for parking at least in a forward direction, and that depicts a virtual control key for controlling the forward travel and a virtual control key for controlling the reverse travel on a touch sensitive screen (touchscreen) of the remote control, which keys, when touched, respectively prompt the vehicle to be made to travel forwards or in reverse, and the forward travel or reverse travel is maintained until the touch is ended or another termination condition (e.g. a critical obstacle or arrival at the maximum displacement path) for terminating the movement is met. Instead of virtual keys on a touch sensitive screen, it is alternatively or additionally also possible for physical keys to be provided for controlling the forward and reverse travel.

It is advantageous when the parking assistance system comprises automated transverse guidance, so that the vehicle is steered into the parking space in automatically directed fashion. By way of example, it is thus possible for a lateral offset between the vehicle and the parking space or an orientation difference between the vehicle and the parking space to be compensated for by the automated transverse guidance when a vehicle is parked in front of the forward parking space.

Preferably, when no parking space has been identified, operation of the control means prompts the vehicle be automatically steered straight on without turning the steering wheel in a forward direction or reverse direction. In this case, it is advantageous when the parking space identification remains activated during straight-on travel, so that the parking space can be identified later in the course of the straight-on travel and, if need be, automated transverse guidance can then be activated for parking in the parking space. When a parking space has been identified, particularly when an identified parking space has also been identified as being able to be parked in (i.e. the simple identification of a parking space is not necessarily sufficient for active transverse guidance), operation of the control means prompts the vehicle to be steered into the parking space in a forward direction or reverse direction in a manner directed using automated transverse guidance. The remote control preferably signals to the operator whether the vehicle is steered into the parking space straight on without turning the steering wheel, or the vehicle is steered into the parking space in a manner directed using automated transverse guidance. By way of example, when a parking space that can be parked in is identified, a different pictogram is depicted on the screen of a remote control than when a parking space is not identified; the pictogram for the identified parking space that can be parked in implicitly signals to the user that the vehicle is steered into the parking space using automated transverse guidance, whereas a pictogram that is depicted on the remote control when a parking space is not identified signals straight-on travel to the user. It is naturally conceivable for the statement "directed parking maneuver" or "undirected parking maneuver" also to be able to be signaled to the driver explicitly by an applicable pictogram (e.g. in the form of a depicted steering wheel) or by absence of this pictogram or by another pictogram (e.g. a crossed-out steering wheel) or by an appropriate text indicator.

Preferably, the remote control comprises a visual display and the identification of the parking space or of a parking space that can be parked in is signaled to the user via this visual display, for example via one or more light-emitting diodes on the remote control. Advantageously, the visual display is an, in particular matrix-based, screen, for example an LCD or OLED screen, however; the screen may be configured as a touchscreen. In this case, the signaling to the user is preferably effected via one or more different pictograms.

A second aspect of the invention relates to a remote control for a parking assistance system, controllable by remote control from outside of a motor vehicle, for automatically parking the motor vehicle in a parking space. The vehicle-based parking assistance system comprises an ambient sensor system for determining surroundings information regarding the vehicle surroundings, parking space identification means for identifying a parking space based on the surroundings information and a bidirectional wireless communication device for sending information about the identification of a parking space from the motor vehicle to the remote control. The remote control has a bidirectional wireless communication device for receiving the information about the identification of a parking space. Further, the remote control comprises signaling means for signaling the presence of an identified parking space to the operator of the remote control based on the received information.

The above explanations pertaining to the method according to the invention in accordance with the first aspect of the invention accordingly also apply to the remote control according to the invention in accordance with the second aspect of the invention. Advantageous exemplary embodiments of the remote control according to the invention that are not explicitly described at this juncture and in the patent claims correspond to the advantageous exemplary embodiments of the method according to the invention that are described above or described in the patent claims.

A third aspect of the invention is directed at the vehicle-based parking assistance system that is controlled via the remote control in accordance with the second aspect of the invention. The parking assistance system comprises an ambient sensor system for determining surroundings information regarding the vehicle surroundings, parking space identification means for identifying a parking space based on the surroundings information and a bidirectional wireless communication device for sending information about the identification of a parking space from the motor vehicle to the remote control.

The above explanations pertaining to the method according to the invention in accordance with the first aspect of the invention accordingly also apply to the vehicle-based parking assistance system according to the invention in accordance with the third aspect of the invention. Advantageous exemplary embodiments of the vehicle-based parking assistance system according to the invention that are not explicitly described at this juncture and in the patent claims correspond to the advantageous exemplary embodiments of the method according to the invention that are described above or described in the patent claims.

Other objects, advantages and novel features of the present invention will become apparent from the following detailed description of one or more preferred embodiments when considered in conjunction with the accompanying drawings.

BRIEF DESCRIPTION OF THE DRAWINGS

The invention is described below on the basis of an exemplary embodiment with reference to the appended drawings, in which.

DETAILED DESCRIPTION OF THE DRAWINGS

Figure 1:
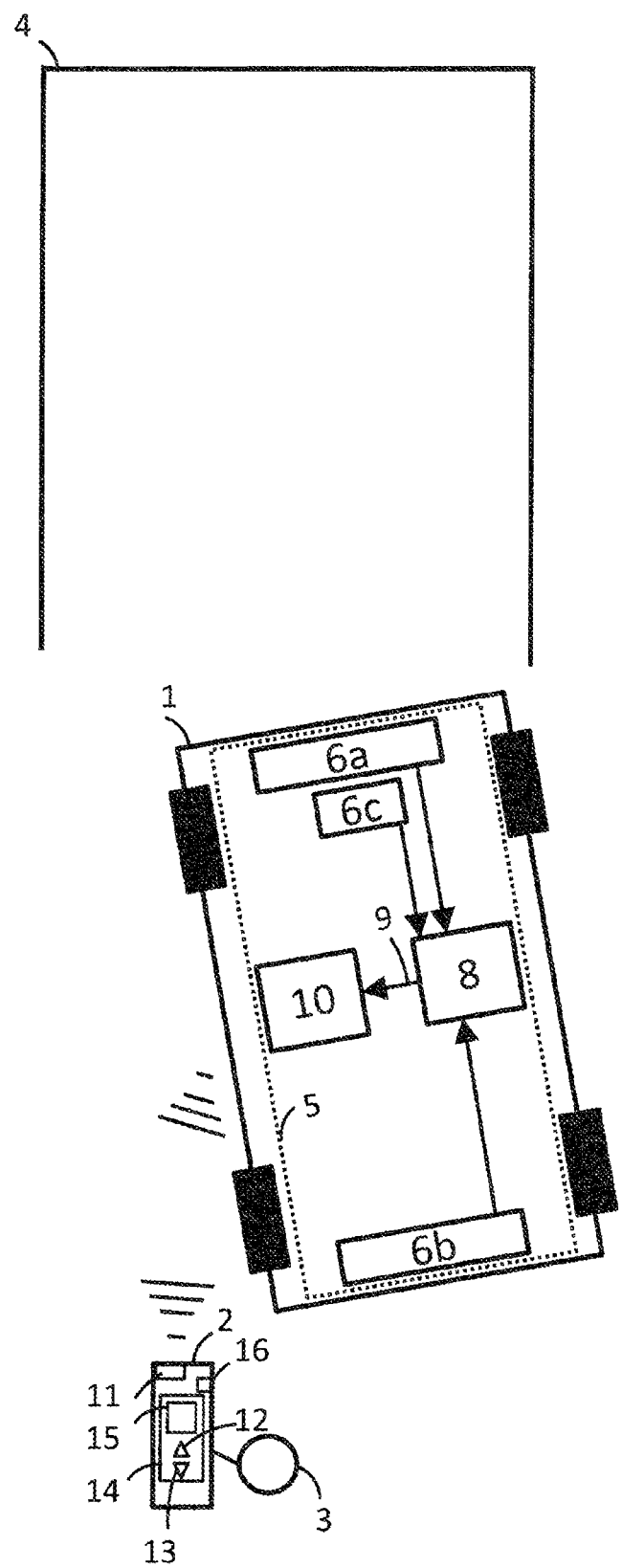
FIG. 1 shows a passenger car with an exemplary embodiment of the parking assistance system according to the invention, which is controllable by remote control.

FIG. 1 schematically depicts a passenger car 1 with an exemplary embodiment of the parking assistance system 5 according to the invention, which is controllable by remote control 2 by an operator 3 of the remote control 2. The remote control 2 is preferably also used as a vehicle key. The parking assistance system 5 supports a parking process into a forward parking space 4. The forward parking space 4 is a garage, for example. The forward parking space 4 can be bounded by a physical boundary, e.g. the garage wall, another vehicle, plants, or else by ground markings. The parking assistant 5 comprises two modes, for example: a parking mode, wherein the parking assistant parks the vehicle on the parking space 4 forwards, and an exit mode, in which the parking assistant 5 takes the vehicle 1 out of the parking space 4 in reverse. Both modes preferably have no positive coupling. Accordingly, the driver can park his vehicle 1 himself, for example, and subsequently have the exit maneuver performed using the function described.

Since the operator 3 is not in the vehicle 1 during the parking maneuver and the vehicle 1 does not now have to be left afterwards, the parking space may also be a narrow parking space in relation to the vehicle width (for example a narrow garage). In order to park the vehicle 1 in the parking space 4, the driver 3 gets out of the vehicle 1 in front of the parking space and uses a remote control 2 to start the automatic parking process. From that time onwards, the parking assistant 5 undertakes control of the drive, braking and steering functions and of the gear shift function and maneuvers the vehicle into the narrow garage—and also out of it again. Thus, the driver continues to be saved the inconvenience of getting in and out in narrow garages and possibly damaged doors. To simplify matters, FIG. 1 does not depict the automatic control functions of the parking assistance system 5 for controlling drive, brakes, etc. or the interface to the applicable controllers of the vehicle 1.

The parking assistance system 5 preferably comprises an ultrasonic sensor system 6a on the vehicle front and an ultrasonic sensor system 6b on the vehicle rear. Preferably, there is also provision for a camera sensor system 6c that is directed forwards. The sensor information from the ambient sensor systems 6a, 6b, 6c is processed further by a parking space identification device 8. On the basis of the sensor information, a parking space is identified in the parking space identification device 8 and the parking space is qualified as able to be parked in or not able to be parked in. Information 9 about the identification of the parking space and the ability thereof to be parked in is sent from a bidirectional wireless communication device 10 to the bidirectional communication device 11 of the remote control 2, particularly in the form of a radio signal. Further, the bidirectional communication device 10 can receive control signals from the remote control 2.

Further, control means 12-13 are provided for controlling the parking process, preferably in the form of virtual keys on a touchscreen 14; alternatively, physical keys are also conceivable. In the case of the exemplary embodiment in FIG. 1, a (in this case virtual) forward key 12 for controlling the forward travel of the passenger car 1 and a (in this case virtual) reverse key 14 for controlling the reverse travel of the passenger car are provided in the remote control 2. By operating and holding the forward key 12, the vehicle 1 is moved in a forward direction, and when the forward key 12 is released the vehicle 1 is slowed down. By operating and holding the forward key 13, the vehicle 1 is moved in a reverse direction, and when the reverse key 13 is released the vehicle 1 is slowed down.

Further, the remote control 2 optionally comprises a dead man's key 16 that additionally needs to be operated by the user 3, otherwise the vehicle is slowed down; when the dead man's key 16 is released the vehicle is preferably slowed down more sharply than when the forward 12 or reverse key 13 is released (e.g. emergency braking in comparison with comfortable braking with lower noise generation).

Furthermore, the remote control 2 comprises a visual display of the identification of the parking space and the ability thereof to be parked in. This is implemented by applicable pictograms on the touchscreen.

The basic sequence of a parking process is described below.

First of all, the driver stops in front of the forward parking space and switches off the motor and engages the P transmission stage. The driver gets out, positions himself behind the vehicle 1 and activates the parking function using the remote control 2. If the dead man's key 16 is pressed, the drive motor is started. To signal the readiness of the vehicle to go, the driving lights, particularly the rear lights of the vehicle, are automatically switched on and the exterior mirrors are automatically folded, for example folded in and folded out again (if the exterior mirrors were previously folded out) or folded out (if the exterior mirrors were previously folded in).

If the driver operates the forward key 12 while the dead man's key 16 continues to be operated, transmission stage D is engaged and the vehicle moves at a setpoint speed prescribed by the longitudinal controller (e.g. 2 km/h) in the direction of the parking space 4. If the system has identified a parking space that can be parked in, the vehicle is also automatically directed in this case.

A change of direction is possible at any time; this requires the reverse key 13 to be operated during forward travel. A fresh change of direction then requires the forward key 12 to be operated again.

To end the parking process, the forward key 12 or the dead man's key 16 can be released. The vehicle then stops in the parking space, changes over the transmission stage from D to P, applies the electric parking brake and stops the motor.

Figure 2:
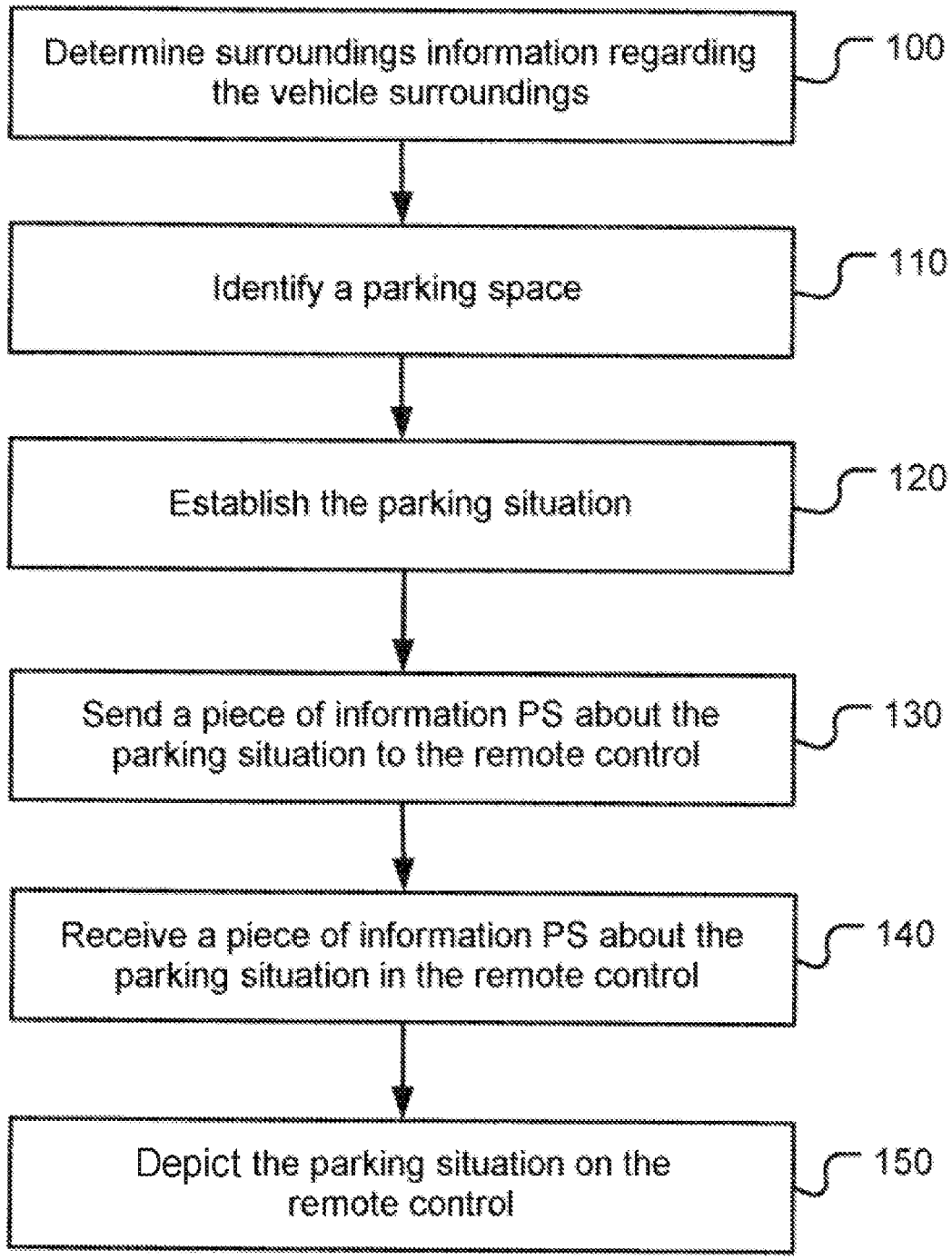
FIG. 2 shows an exemplary flowchart for the method according to the invention.

FIG. 2 depicts an exemplary flowchart for the signaling of the identification of a parking space and the ability thereof to be parked in to the user 3 using the remote control 2.

In step 100, surroundings information regarding the vehicle surroundings is ascertained by means of the ambient sensor system 6a, 6b, 6c. This happens while actually driving up to the parking space 4 until the vehicle 1 is parked in front of the parking space 4, provided that there has been a drop below a limit speed of, by way of example, 10 km/h, and preferably also afterwards during the automated parking process. To this end, the ambient sensor system 6a, 6b, 6c is used to determine the position of objects, for example the position of lateral boundaries of a parking space such as vehicles, lateral walls of a garage or markings put on the ground, and these objects are entered in a surroundings map of the vehicle surroundings.

Figure 3:
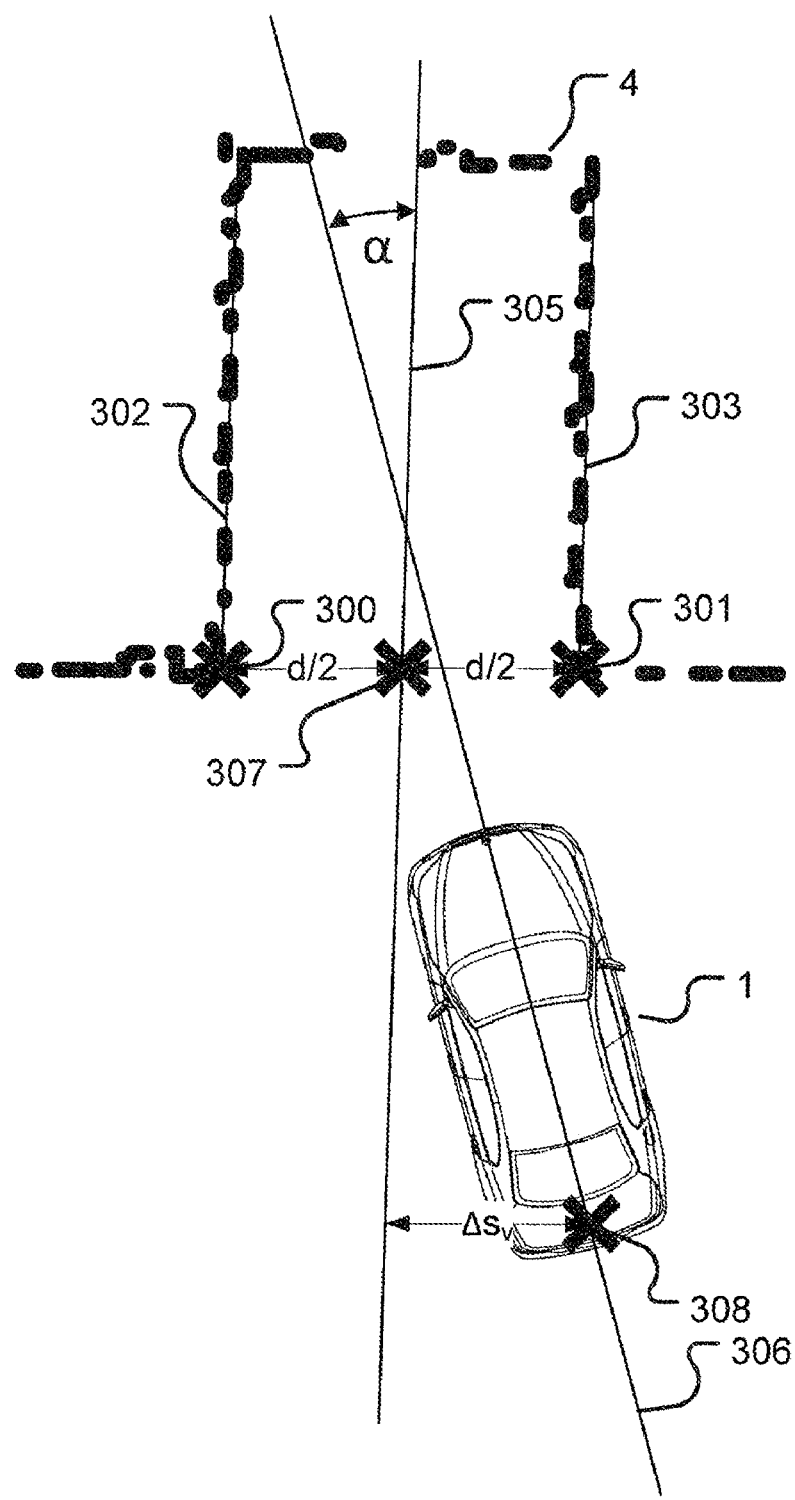
FIG. 3-FIG. 6 show the determination of anchor points, lateral parking space orientation lines and the parking line in various exemplary situations.

In step 110, the motor vehicle 1 identifies a parking space based on the surroundings information. By way of example, the identification of a parking space involves a left and a right anchor point (typically the two corners of the entrance) being determined that denote the entrance of the parking space. FIG. 3 depicts an exemplary left anchor point 300 and an exemplary right anchor point 301 in a surroundings map with the identified objects. Ideally, an anchor point is situated on a lateral parking space orientation line (in the case of the anchor point 300, the parking space orientation line 301, and in the case of the anchor point 301). The lateral parking space orientation lines 302, 303 are determined from the detected objects (physical objects such as vehicle or walls or a marking on the ground surface) of the boundary of the parking space 4. A parking space is preferably deemed to have been identified when at least one anchor point and a lateral parking space orientation line on the same side of the parking space 4 or a second anchor point on the other side are found.

Further, a parking line 305 is determined. The parking line 305 is used for computing the input signal for the transverse controller of the transverse guidance. The parking line 305 preferably has no defined length and is preferably of infinite length.

When it has been possible to find a right parking space orientation line 301 and a left parking space orientation line 302, the orientation of the parking line 305 corresponds to the mean value (e.g. 15° in reference to the vehicle longitudinal axis 306) from the orientation (e.g. 10° in reference to the vehicle longitudinal axis 306) of the lateral parking space orientation line 302 and the orientation (e.g. 20° in reference to the vehicle longitudinal axis 306) of the other lateral parking space orientation line 303.

The parking line is positioned such that the distances of the two anchor points 300, 301 from the parking line 305 are essentially identical.

Preferably, a center of rotation 307 is determined in order to stipulate the position of the parking line 305. The position of the parking line 305 is defined by the center of rotation 307, through which the parking line 305 must run and which is arranged centrally between the two anchor points 301, 302, specifically preferably such that the lengths d/2 of the two perpendiculars of the two anchor points 300, 301 to the parking line 305 are identical.

If a parking space cannot be identified (for example because only a single anchor point 301, 302 without an associated lateral parking space orientation line can be found), then the parking line 305 is chosen to be identical to the vehicle longitudinal axis 306, so that the vehicle is moved straight on along the vehicle longitudinal axis.

If only a single lateral parking orientation line 302, 303 and at least the associated anchor point 300, 301 on the same side can be determined, then the orientation of the parking line 305 corresponds to the orientation of the one parking orientation line 302, 303.

Figure 4:
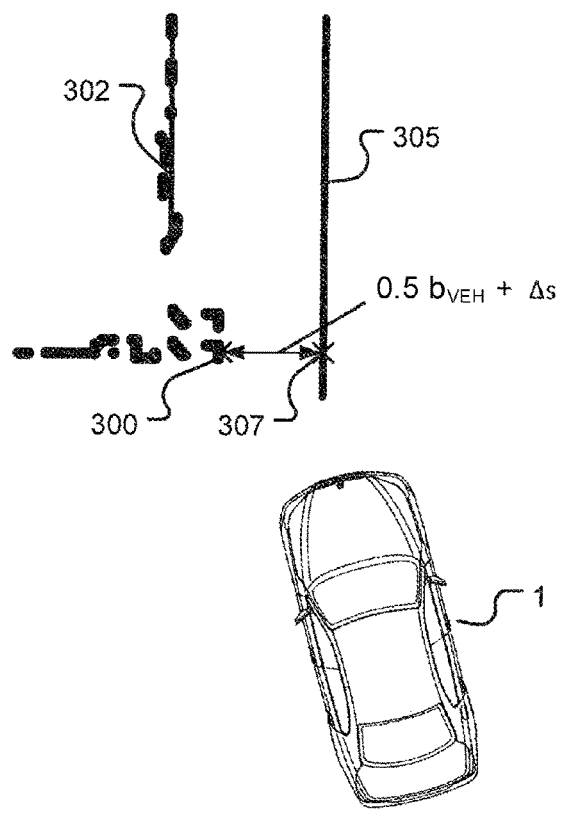

If only a single anchor point 300, 301 can be found in this case or if the parking space width is greater than a threshold value $b_{max}$ for the parking space width, then the parking orientation line 302, 303 is positioned at a particular distance from the anchor point, for example at the distance of half the vehicle width $b_{VEH}$ plus a safety distance $\Delta s$ (e.g. $\Delta s$=0.45 m). The center of rotation 307 is therefore computed as follows, for example: the perpendicular of the center of rotation 307 on the parking orientation line 302, 303 must run through the anchor point 300, 301 of the associated parking orientation line 302, 303. The distance of the center of rotation 307 from this anchor point 300, 301 in this case corresponds to half the vehicle width $b_{VEH}$ plus a safety distance Δs (e.g. Δs=0.45 m), for example. This is depicted by way of example in FIG. 4.

Figure 5:
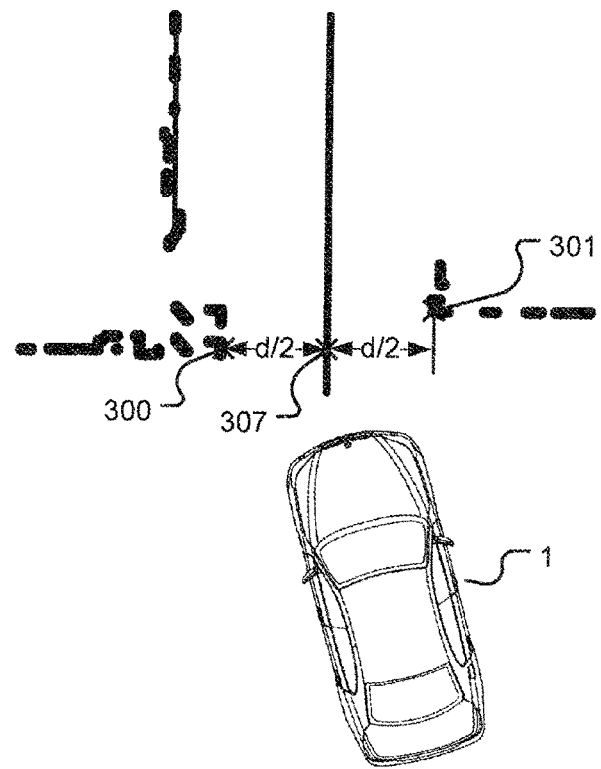

If two anchor points 300, 301 and only a single lateral parking orientation line 302, 303 can be found and the distance between the anchor points 300, 301 is less than or equal to the maximum parking space width $b_{max}$, then the center of rotation 307 is determined as follows: the parking line 305 needs to be positioned such that the lengths of the perpendiculars of the anchor points 300, 301 to the parking line 305 are essentially the same. This is depicted by way of example in FIG. 5.

Figure 6:
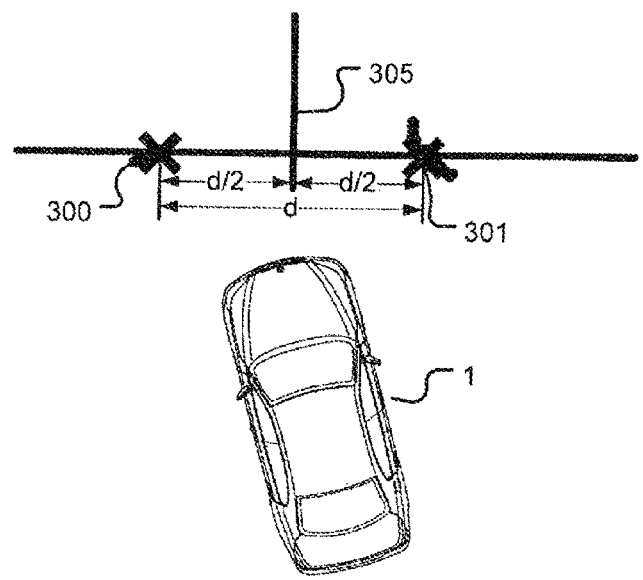

If it is possible to find two anchor points 300, 301 at a distance of greater than the minimum parking space width $b_{min}$ (e.g. 2.60 m) and less than the maximum parking space width $b_{max}$ (e.g. 3.50 m), but no lateral parking space orientation line, then the parking line 305 has its orientation defined as an orthogonal on the straight line that runs through the two anchor points 300, 301, the parking line 305 running through the central point of the straight line between the two anchor points 300, 301. This is depicted by way of example in FIG. 6.

If the distance between two anchor points is less than the minimum parking space width $b_{min}$, then the parking line 305 is defined in accordance with the vehicle longitudinal axis 306, so that the vehicle 1 travels straight on.

In step 120 in FIG. 2, identification of the parking space on the basis of multiple criteria is followed by the current parking situation being ascertained from a plurality of possible parking situation types. The possible parking situation types are, by way of example:

1. no identified parking space,
2. an identified parking space that can be parked in, which can be parked in from the current vehicle position by remote control using the parking assistance system,
3. an identified parking space that can be parked in, which can be parked in from the current vehicle position by remote control using the parking assistance system, wherein the Q factor of the ability of the parking space to be parked in is lower than in the case of the aforementioned 3rd parking situation type, and
4. an identified parking space that cannot be parked in from the current vehicle position by remote control using the parking assistance system.

In this regard, it is particularly established whether the possibly identified parking space 4 can be parked in. In order to check the ability of the parking space to be parked in, the angle α between the orientation of the vehicle longitudinal axis 306 and the orientation of the parking line 305 is determined (see FIG. 3). Further, the lateral offset $\Delta s_v$ of the vehicle 1 with respect to the parking space 4 is determined. The lateral offset $\Delta s_v$ corresponds to the length of the perpendicular of the vehicle reference point (for example middle of the rear axle) to the parking line 305, for example, as depicted by way of example in FIG. 3. Further, the width b of the parking space 4 is determined, for example as the distance between the two anchor points 301, 302. Furthermore, the distance a between the vehicle and the parking space is determined, for example as distance a between a vehicle reference point (the middle 308 of the rear axle) and a reference point on the parking space (e.g. the center of rotation).

The $1^{st}$ parking situation type with the parking space not identified exists when at least one anchor point and a lateral parking space orientation line on the same side or a second anchor point on the other side are not found.

The $2^{nd}$ parking situation type with a parking space that can be parked in exists when the following conditions are cumulatively met:
the absolute value of the angle α is less than or equal to a threshold value $\alpha_{,TH,1}$ (e.g. $\alpha_{,TH,1}$=10°),
the absolute value of the lateral offset $\Delta s_v$ is less than or equal to a threshold value $\Delta s_{v,TH,1}$ (e.g. $\Delta s_{v,TH,1}$=1 m),
the width b of the parking space is greater than or equal to the minimum width $b_{min}$ and
the distance a is less than or equal to a threshold value $a_{max}$.

The existence of the $3^{rd}$ parking situation type with a parking space that can be parked in with a low Q factor for the ability of the parking space to be parked in is established when the following conditions are cumulatively met:
the absolute value of the angle α is less than or equal to a threshold value $\alpha_{,TH,2}>\alpha_{,TH,1}$ (e.g. $\alpha_{,TH,2}$=30°),
the absolute value of the lateral offset $\Delta s_v$ is less than or equal to a threshold value $\Delta s_{v,TH,2}>\Delta s_{v,TH,1}$ (e.g. $\Delta s_{v,TH,2}$=1.5 m),
the width b of the parking space is greater than or equal to the minimum width $b_{min}$ and
the distance a is less than or equal to a threshold value $a_{max}$.

The existence of the $4^{th}$ parking situation type with the parking space that is identified but that cannot be parked in is established when one of the following conditions is met:
the absolute value of the angle α is greater than the threshold value $\alpha_{,TH,2}$ (e.g. $\alpha_{,TH,2}$=30°),
the absolute value of the lateral offset $\Delta s_v$ is greater than the threshold value $\Delta s_{v,TH,2}$ (e.g. $\Delta s_{v,TH,2}$=1.5 m),
the width b of the parking space is less than the minimum width $b_{min}$ or
the distance a is greater than the threshold value $a_{max}$.

Instead of the 4 criteria described above, it is possible, in an alternative embodiment, for just a subset of these 4 criteria to be checked.

The information PS about the currently existing parking situation type is sent from the vehicle to the remote control 2 in step 130. The information PS about the currently existing parking situation type is, by way of example, a byte whose value describes the currently existing parking situation type.

The information PS about the currently existing parking situation type is received by the remote control 2 in step 140.

Based on the information PS about the currently existing parking situation type, a pictogram associated with the information PS is depicted on the screen 14 (see step 150).

Figure 7:
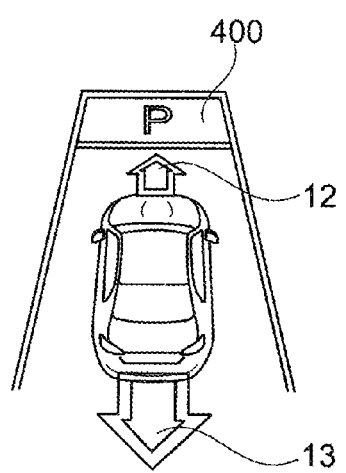
FIG. 7-FIG. 8 show exemplary graphical depictions on a touchscreen of the remote control.

If, in accordance with the information PS, the $2^{nd}$ parking situation with a parking space that can be parked in exists, then the touchscreen 14 depicts the image shown in FIG. 7 with the virtual control keys 12 and 13 for the forward direction and the reverse direction, for example. The identified parking space that can be parked in, in accordance with the $2^{nd}$ parking situation type, is depicted as pictogram 400.

If, in accordance with the information PS, the $3^{rd}$ parking situation with a parking space that can be parked in, but a lower Q factor for the ability of the parking space to be parked in, exists, then the touchscreen 14 depicts the image shown in FIG. 7, for example, wherein the depicted pictogram has a different color than in the case of the $2^{nd}$ parking situation to allow the user to distinguish between them (e.g. green in the case of the $2^{nd}$ parking situation and blue in the case of the $3^{rd}$ parking situation).

Figure 8:
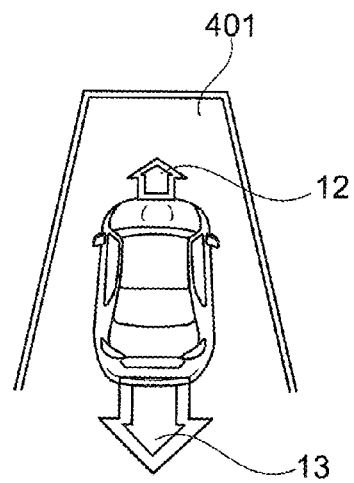

If, in accordance with the information PS, the $1^{st}$ parking situation (parking space not identified) or the $4^{th}$ parking situation (parking space identified, but not able to be parked in) exists, then the image depicted in FIG. 8 is depicted on the touchscreen, the pictogram 401 having no parking space highlighted in it, and instead the route being continued without a parking space.

The parking situation that is determined in the vehicle-based parking assistance system, and the signaling of the parking situation on the remote control, can be continually updated during the parking maneuver when circumstances change. By way of example, the parking situation can change from the $3^{rd}$ parking situation to the $2^{nd}$ parking situation or from the first parking situation 1. to the $2^{nd}$, $3^{rd}$ or $4^{th}$ parking situation. The change is then accordingly communicated to the user on the screen.

In this exemplary embodiment, the vehicle can be steered into the parking space in a manner directed with automated transverse guidance only in parking situations 2. and 3., the longitudinal axis 306 of the motor vehicle 1 being controlled or regulated for the parking line 305 as part of the transverse guidance.

To this end, the current actual angle α between the current orientation of the vehicle longitudinal axis 306 and the parking line 305 and the current actual offset $\Delta s_v$ between the vehicle 1 and the parking line 305 are continually determined during the parking maneuver, for example. These variables α, $\Delta s_v$ are used by the transverse controller of the transverse guidance as input variables. The transverse controller attempts to bring the actual angle α and the actual offset $\Delta s_v$ to zero, so that the vehicle is guided to the parking line 305.

In parking situations 1. and 4., the parking line 305 is chosen in accordance with the vehicle longitudinal axis 306, so that there is no discrepancy α, $\Delta s_v$ and the vehicle 1 travels straight on.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method, comprising:
   detecting, by a motor vehicle having a parking assistance system controllable by a remote control, that one from among a set of potential scenarios is currently present, wherein the set of potential scenarios includes:
   a parking space is present and can be parked-in,
   the parking space is present but cannot be parked-in, and
   the parking space is not present,
   wherein the detection is based on vehicle sensor system captured surroundings information; and
   controlling the vehicle on the basis of the detection and a user operation of the remote control, so as to maneuver the motor vehicle according to one from among a set of potential maneuvers, wherein the set of potential maneuvers includes:
   in response to detecting that the parking space is present and can be parked-in, maneuvering the vehicle to park in the parking space using automated transverse guidance,
   in response to detecting that the parking space is present but cannot be parked in, maneuvering the vehicle forward and/or reverse without using automated transverse guidance, and
   in response to detecting that the parking space is not present maneuvering the vehicle forward and/or reverse without using automated transverse guidance.

2. The method as claimed in claim 1, wherein the parking space is a forward parking space, and the detection is further based on one or more criteria that relate to:
   an orientation of the vehicle with respect to the parking space,
   a lateral offset of the vehicle with respect to the parking space,
   a width of the parking space, and
   a distance of the vehicle from the parking space.

3. The method as claimed in claim 1, further comprising:
   determining a Q-factor reflecting a difficulty level for the parking assistance system to park the vehicle in the parking space from the current location;
   identifying a parking situation from among the following:
   (a) a high Q-factor parking situation in which the determined Q-factor exceeds a predetermined threshold, and
   (b) a low Q-factor parking situation in which the determined Q-factor does not exceed the predetermined threshold;
   transmitting the identified parking situation to the remote control;
   signaling, by the remote control, the identified parking situation to the operator.

4. The method as claimed in claim 1, further comprising:
   identifying a parking situation from among the following parking situations:
   (a) a no identified parking space situation,
   (b) a parkable-in parking space situation,
   (c) a parkable-in parking space situation, in which a Q-factor is lower than in (b), and
   (d) an un-parkable-in parking space situation,
   wherein the Q-factor reflects a difficulty level for the parking assistance system to park the vehicle in the parking space from the current location.

5. The method as claimed in claim 3, further comprising:
   identifying the parking situation from among the further following parking situations:
   (a) a no identified parking space situation,
   (b) a parkable-in parking space situation,
   (c) a parkable-in parking space situation, in which the Q-factor is lower than in (b), and
   (d) an un-parkable-in parking space situation.

6. The method as claimed in claim 4, further comprising:
   signaling, by the remote control, the identified parking situation to the operator, wherein at least two of the parking situations are respectively signaled in a manner distinguishable for the operator using different pictograms associated with the respective parking situations displayed on a screen of the remote control.

7. The method as claimed in claim 1, wherein the parking assistance system is configured to park the motor vehicle in forward parking spaces by traveling at least one of forward and reverse, and wherein the remote control comprises a control means for controlling the at least one of forward and reverse travel of the motor vehicle.

8. The method as claimed in claim 7, wherein the automated transverse guidance maneuvers the motor vehicle into the parking space in an automatically directed fashion.

9. The method as claimed in claim 1, further comprising:
   signaling, by the remote control to the operator, whether the vehicle is steered into the parking space straight on without turning the steering wheel or the vehicle is steered into the parking space in a manner directed using automated transverse guidance.

10. The method as claimed in claim 7, further comprising:
in response to detecting the parking space:
determining a parking line in the longitudinal direction of the parking space, based on the surroundings information, and
operating the parking assistance system to control the vehicle to park in the parking space using automated transverse guidance, wherein a longitudinal axis of the motor vehicle is regulated to a parking line.

11. The method as claimed in claim 10, wherein the method further comprises at least one of:
checking a criterion relating to an orientation of the vehicle with respect to the parking space based on an orientation of the vehicle longitudinal axis and an orientation of the parking line;
checking a criterion relating to a lateral offset of the vehicle with respect to the parking space based on a length of a perpendicular of a vehicle reference point to the parking line.

12. The method as claimed in claim 1, wherein the remote control comprises a visual display for signaling to the operator.

13. The method as claimed in claim 12, wherein the remote control comprises a screen as the visual display, and the signaling to the operator is via a pictogram depicted on the screen.

14. The method of claim 1,
wherein detecting that the parking space is present and can be parked in is based on surroundings information indicating: respective positions of a first anchor point denoting an entrance of the parking space, and at least one of: a lateral orientation line on a same side of the first anchor point, and a second anchor point opposite the first anchor point, and
wherein detecting that the parking space is not present or cannot be parked in is based on surroundings information indicating:
the respective positions of the first anchor point, and at least one of: the lateral orientation line and the second anchor point, or
the absence of at least one of: the first anchor point, and at least one of: the lateral orientation line and the second anchor point.

15. A remote control for a parking assistance system that is controllable by remote control from outside a motor vehicle to automatically parking the motor vehicle in a parking space, the remote control comprising:
a bidirectional wireless communication device that initiates the parking assistance system to control the vehicle via user operation of the remote control, so as to maneuver the motor vehicle such that:
in response to detecting, by the parking assistance system, that the parking space is present in the vehicle surroundings and can be parked-in, the parking assistance system maneuvers the vehicle to park in the parking space using automated transverse guidance,
in response to detecting, by the parking assistance system, that the parking space is present but cannot be parked-in, the parking assistance system maneuvers the vehicle forward and/or reverse without using automated transverse guidance, and
in response to detecting, by the parking assistance system, that the parking space is not present, the parking assistance system maneuvers the vehicle forward and/or reverse without using automated transverse guidance,
wherein the detections by the parking assistance system are based on vehicle sensor system captured surroundings information.

16. A vehicle-based parking assistance system, controllable by remote control from outside a motor vehicle to automatically park the motor vehicle, the vehicle-based parking assistance system comprising:
an ambient sensor system that determines surroundings information regarding the vehicle surroundings;
parking space identification means that detects that one from among a set of potential scenarios is currently present, wherein the set of potential scenarios includes:
a parking space is present and can be parked-in,
the parking space is present but cannot be parked-in, and
the parking space is not present,
wherein the determination is based on the surroundings information; and
one or more controllers that control the vehicle on the basis of the detection and a user operation of the remote control according to one from among a set of potential maneuvers, wherein the set of potential maneuvers includes:
in response to detecting that the parking space is present and can be parked-in, maneuvering the vehicle to park in the parking space using automated transverse guidance,
in response to detecting, by the parking assistance system, that the parking space is present but cannot be parked-in, maneuvering the vehicle forward and/or reverse without using automated transverse guidance, and
in response to detecting that the parking space is not present maneuvering the vehicle forward and/or reverse without using automated transverse guidance.

* * * * *